(12) United States Patent
Johnson et al.

(10) Patent No.: US 7,902,316 B2
(45) Date of Patent: Mar. 8, 2011

(54) POLYETHERSULFONE COMPOSITION, METHOD OF MAKING AND ARTICLES THEREFROM

(75) Inventors: Donald Scott Johnson, New York, NY (US); Daniel Steiger, Clifton Park, NY (US); Daniel Joseph Brunelle, Burnt Hills, NY (US); Sean Elliot Armstrong, East Greenbush, NY (US)

(73) Assignee: Sabic Innovative Plastics IP B.V. (NL)

( * ) Notice: Subject to any disclaimer, the term of this patent is extended or adjusted under 35 U.S.C. 154(b) by 1003 days.

(21) Appl. No.: 11/388,710

(22) Filed: Mar. 24, 2006

(65) Prior Publication Data

US 2006/0167216 A1 Jul. 27, 2006

Related U.S. Application Data

(63) Continuation-in-part of application No. 10/719,609, filed on Nov. 20, 2003, now abandoned.

(51) Int. Cl.
  C08G 75/23 (2006.01)
  C08G 75/00 (2006.01)
  C08G 75/20 (2006.01)

(52) U.S. Cl. ......... 528/175; 528/373; 528/391; 528/425; 528/486; 528/104

(58) Field of Classification Search .................. 528/175, 528/373, 391, 425, 486, 104
  See application file for complete search history.

(56) References Cited

U.S. PATENT DOCUMENTS

| | | | |
|---|---|---|---|
| 2,991,273 A | 7/1961 | Hechelhammer et al. |
| 2,999,835 A | 9/1961 | Goldberg |
| 3,028,365 A | 4/1962 | Schnell et al. |
| 3,148,172 A | 9/1964 | Fox |
| 3,271,367 A | 9/1966 | Schnell |
| 3,271,368 A | 9/1966 | Goldberg et al. |
| 3,563,951 A | 2/1971 | Radlmann et al. |
| 4,065,437 A | 12/1977 | Blinne et al. |
| 4,108,837 A | 8/1978 | Johnson et al. |
| 4,156,068 A | 5/1979 | Hartmann |
| 4,175,175 A | 11/1979 | Johnson et al. |
| 4,217,438 A | 8/1980 | Brunelle et al. |
| 4,310,654 A | 1/1982 | Carnahan |
| 4,598,137 A | 7/1986 | Guiver et al. |
| 4,695,612 A | 9/1987 | Takekoshi et al. |
| 4,757,120 A | 7/1988 | Bristowe et al. |
| 4,814,419 A | 3/1989 | Cotter et al. |
| 4,816,505 A | 3/1989 | Cotter et al. |
| 4,849,503 A | 7/1989 | Cotter et al. |
| 4,959,454 A | 9/1990 | Fukuyama |
| 5,081,298 A | 1/1992 | Brunelle |
| 5,229,482 A | 7/1993 | Brunelle |
| 5,693,740 A | 12/1997 | Colquhoun et al. |
| 5,830,974 A | 11/1998 | Schmidhauser et al. |
| 5,908,915 A | 6/1999 | Brunelle |
| 6,228,970 B1 | 5/2001 | Savariar |
| 6,355,764 B1 | 3/2002 | Hun et al. |
| 6,417,255 B1 | 7/2002 | Penning et al. |
| 6,495,615 B1 | 12/2002 | Gallucci |
| 2005/0113558 A1 | 5/2005 | Johnson et al. |

FOREIGN PATENT DOCUMENTS

| EP | 0 297 849 | 1/1989 |
|---|---|---|
| EP | 0 859 022 | 8/1998 |
| GB | 1264900 | 2/1972 |

OTHER PUBLICATIONS

Journal of Polymer Science, "Poly(aryl Ethers) by Nucleophilic Aromatic Substitution. I. Synthesis and Properties", Part A-1, vol. 5, pp. 2375-2398, 1967.
Journal of Polymer Science, "Synthesis of Poly(arylene Ether)s Based on 9,9-Bis(3,5-Diphenyl-l-Hydroxyphenyl)fluorene", Part A, vol. 29, pp. 1045-1052, 1991.
Journal of Polymer Science, "Synthesis and Properties of Aromatic Poly(ether sulfone)s and Poly(ether ketone)s Based on Methyl-Substituted Biphenyl-4,4'-Diols", Part A, vol. 32, pp. 317-322, 1994.
Written Opinion for International Application No. PCT/US2007/063774, International Filing Date Dec. 3, 2007, 5 pages.
International Search Report for International Application No. PCT/US2007/063774, mailed Aug. 7, 2001, 5 pages.

*Primary Examiner* — Duc Truong
(74) *Attorney, Agent, or Firm* — Cantor Colburn LLP

(57) ABSTRACT

A polyethersulfone composition is disclosed which comprises structural units derived from bisphenol-A and 4,4'-biphenol, the structural units derived from 4,4'-biphenol being present in an amount corresponding to greater than 65 mole percent based on total moles of structural units derived from diphenolic monomers, wherein the polyethersulfone has a weight average molecular weight ($M_w$) of at least 54,000 grams per mole as measured by gel permeation chromatography. The polyethersulfone compositions of the invention display outstanding impact strength as measured using ASTM D256. Surprisingly, the polyethersulfone compositions of the invention show enhanced impact strength relative to known polyethersulfones such as RADEL R, a commercially available polyethersulfone engineering thermoplastic comprised of structural units derived from a dihalodiarylsulfone and 4,4'-biphenol and having a Notched Izod impact strength of about 700 Joules per meter.

28 Claims, No Drawings

US 7,902,316 B2

POLYETHERSULFONE COMPOSITION, METHOD OF MAKING AND ARTICLES THEREFROM

CROSS REFERENCE TO RELATED APPLICATIONS

This application is a continuation-in-part of application Ser. No. 10/719,609, filed Nov. 20, 2003 now abandoned. This application claims priority to and benefit from the foregoing disclosure.

BACKGROUND OF THE INVENTION

This invention relates to a polyethersulfone composition, a method to synthesize the polyethersulfone composition and articles made from the compositions.

Polyethersulfones are typically linear, amorphous, injection moldable polymers possessing a number of desirable features such as excellent high temperature resistance, good electrical properties and toughness. Due to their excellent properties, the polyethersulfones can be used to manufacture a variety of useful articles such as molded articles, films, sheets and fibers. The polyethersulfones offer high chemical and solvent resistance and are particularly useful for manufacturing articles that are exposed to solvents or chemical agents at elevated temperatures and for extended times. Thus, they find application in articles such as medical trays, which are subjected to repeated and rigorous sterilization procedures.

Many of the articles made from polyethersulfones are manufactured by injection or other molding processes. Although the currently available polyethersulfones have been very successful for the manufacture of molded articles, there is a continuing need for polyethersulfones of improved combinations of properties such as improved melt flow characteristics so that molding operations can be performed more rapidly and with improved economics. Also it is desirable that the polyethersulfone composition has good impact and heat resistance without the consequent loss of other desirable characteristics. Typically, it is difficult to obtain good flow, high impact strength and high heat resistance in a particular polyethersulfone composition.

British patent GB 1,264,900 teaches a process for production of a polyethersulfone comprising structural units derived from equimolar amounts of the reactants 4,4'-biphenol and bisphenol-A (4,4'-isopropylidenediphenol). However, the patent requires that the said reactants be present in amounts deviating from equimolar by no more than plus/minus 5 mole %.

U.S. Pat. No. 6,228,970 describes polyethersulfones comprising structural units derived from 4,4'-biphenol. However, this patent does not teach or suggest any relationship between the content of structural units derived from biphenol and the minimum molecular weight of the polyethersulfone necessary to obtain an optimum balance of physical properties. Therefore, there is a continuing need for polyethersulfones possessing a balanced property profile including high impact strength and good flow properties.

U.S. Pat. No. 4,814,419 describes polyethersulfones comprising structural units derived from bisphenol A and 4,4'-biphenol. However, this patent does not teach or suggest any relationship between the content of structural units derived from 4,4'-biphenol and bisphenol A, and the minimum molecular weight of the polyethersulfone necessary to obtain high strength materials displaying Notched Izod values superior to commercially available polyethersulfones such as RADEL R, a commercially available polyethersulfone comprising structural units derived from 4,4'-biphenol and a bis(4-halophenyl)sulfone. U.S. Pat. No. 4,814,419 discloses a polyethersulfone composition comprised of structural units derived from a bis(4-halophenyl)sulfone, 4,4'-biphenol and bisphenol A, the structural units derived from 4,4'-biphenol and bisphenol A being present in a molar ratio of 75:25. While the reference does not report a molecular weight, a glass transition temperature is provided for the 75:25 material. The reported glass transition temperature, 205° C., corresponds to a weight average molecular weight ($M_w$) of less than 54,000 grams per mole as determined by gel permeation chromatography.

BRIEF DESCRIPTION OF THE INVENTION

The present inventors have unexpectedly discovered that polyethersulfones with molecular weights above a certain level and comprising structural units derived from 4,4'-biphenol and bisphenol-A (BPA) monomers, wherein the structural units derived from 4,4'-biphenol represent greater than 65 mole percent of all structural units derived from diphenolic monomers, show excellent combinations of properties such as flow, impact strength and heat resistance. Thus, in one embodiment the present invention is a polyethersulfone composition comprising structural units derived from bisphenol-A and 4,4'-biphenol, the structural units derived from 4,4'-biphenol being present in an amount corresponding to greater than 65 mole percent based on total moles of structural units derived from diphenolic monomers, wherein the polyethersulfone has a weight average molecular weight ($M_w$) of at least 54,000 grams per mole as measured by gel permeation chromatography.

In one embodiment, the present invention provides a polyethersulfone composition consisting essentially of structural units derived from a bis(4-halophenyl)sulfone, bisphenol-A, and 4,4'-biphenol, said 4,4'-biphenol structural units being present in an amount corresponding to greater than 65 mole percent based on total moles of structural units derived from diphenolic monomers, wherein the polyethersulfone has a weight average molecular weight ($M_w$) of at least 54,000 grams per mole as measured by gel permeation chromatography.

Also disclosed is a method for the preparation of the polyethersulfones of the present invention and articles comprising from said polyethersulfones.

Various other features, aspects, and advantages of the present invention will become more apparent with reference to the following description, examples, and appended claims.

DETAILED DESCRIPTION OF THE INVENTION

The present invention may be understood more readily by reference to the following detailed description of preferred embodiments of the invention and the examples included herein. In this specification and in the claims, which follow, reference will be made to a number of terms which shall be defined to have the following meanings. The singular forms "a", "an" and "the" include plural referents unless the context clearly dictates otherwise. "Optional" or "optionally" means that the subsequently described event or circumstance may or may not occur, and that the description includes instances where the event occurs and instances where it does not.

Polyethersulfones of the present invention comprise structural units derived from bisphenol-A (BPA), 4,4'-biphenol and at least one dihalodiarylsulfone monomer, each of bisphenol A and 4,4'-biphenol representing a diphenolic monomer. Dihalodiarylsulfone monomers are also at times referred to herein as bishalophenylsulfones. In one embodiment, the polyethersulfone is prepared from a monomer mixture comprising bisphenol-A monomer and 4,4'-biphenol monomer, said monomer mixture sometimes being referred to herein as a monomer mixture comprising diphenolic monomers, each of bisphenol A and 4,4'-biphenol representing a diphenolic monomer.

As noted, the polyethersulfones of the invention comprise structural units derived from both 4,4'-biphenol and bisphenol A, wherein the structural units derived from 4,4'-biphenol account for greater than 65 mole percent of all structural units derived from a diphenolic monomer present in the polymer. As noted, structural units derived from bisphenol A are also present in the polyethersulfones provided by the present invention. In one embodiment, the polyethersulfone of the present invention comprises structural units derived from 4,4'-biphenol and bisphenol A wherein the structural units derived from 4,4'-biphenol comprise at least 70 mole percent of all structural units derived from a diphenolic monomer, and the structural units derived from bisphenol A comprise less than or equal to 30 mole percent of all structural units derived from a diphenolic monomer. In another embodiment the polyethersulfone comprises structural units derived from a mixture of diphenolic monomers comprising at least 70 mole percent of 4,4'-biphenol and less than or equal to 30 mole percent bisphenol-A, based on the total moles of diphenolic monomers. Those skilled in the art will appreciate that where a mixture of diphenolic monomers is employed, the product polyethersulfone will comprise structural units derived from the components of that mixture of diphenolic monomers. In instances in which the component diphenolic monomers have similar reactivities (as do the disodium salts of 4,4'-biphenol and bisphenol A) the product polyethersulfone will comprise a statistical distribution of structural units derived from the diphenolic monomers. In one embodiment, the polyethersulfone comprises structural units derived from 4,4'-biphenol and bisphenol A wherein the structural units derived from 4,4'-biphenol comprise from 70 mole percent to about 98 mole percent of all structural units derived from a diphenolic monomer. In another embodiment, the polyethersulfone comprises structural units derived from 4,4'-biphenol and bisphenol A wherein the structural units derived from 4,4'-biphenol comprise from 70 mole percent to about 85 mole percent of all structural units derived from a diphenolic monomer. In yet another embodiment, the polyethersulfone comprises structural units derived from 4,4'-biphenol and bisphenol A wherein the structural units derived from 4,4'-biphenol comprise from 70 mole percent to about 80 mole percent of all structural units derived from a diphenolic monomer. In certain embodiments, the polyethersulfone composition provided by the present invention comprises structural units derived from 4,4'-biphenol and bisphenol A as essentially the only structural units in the composition derived from diphenolic monomers. In certain embodiments, the polyethersulfone composition consists essentially of structural units derived from a dihalodiarylsulfone, bisphenol-A, and 4,4'-biphenol, said structural units derived from 4,4'-biphenol being present in an amount corresponding to greater than 65 mole percent based on total moles of structural units derived from diphenolic monomers. In an alternate embodiment, the polyethersulfone composition consists essentially of structural units derived from a chain termination agent, a dihalodiarylsulfone, bisphenol-A, and 4,4'-biphenol, said structural units derived from 4,4'-biphenol being present in an amount corresponding to greater than 65 mole percent based on total moles of structural units derived from diphenolic monomers. In yet another embodiment, the polyethersulfone composition of the present invention consists essentially of structural units derived from a bis(4-halophenyl)sulfone, bisphenol-A, 4,4'-biphenol, and an additional diphenolic monomer, said structural units derived from 4,4'-biphenol being present in an amount corresponding to greater than 65 mole percent based on total moles of structural units derived from diphenolic monomers, said structural units derived from the additional diphenolic being present in an amount corresponding to less than 5 mole percent based on total moles of structural units derived from diphenolic monomers. The polyethersulfone compositions provided by the present invention typically exhibit Notched Izod impact strength values of greater than 700 Joules per meter as measured by ASTM D256.

As noted, in addition to structural units derived from 4,4'-biphenol and bisphenol-A monomers, the polyethersulfone compositions of the invention may comprise structural units derived from at least one additional diphenolic monomer. In one embodiment, the polyethersulfone compositions provided by the present invention comprise 5 mole % or less of structural units derived from at least one additional diphenolic monomer based on the total moles of structural units derived from diphenolic monomers. The additional diphenolic monomer may comprise a biphenol other than 4,4'-biphenol including, but not limited to, substituted derivatives of 4,4'-biphenol. Suitable substituents on one or both aromatic rings of additional biphenol monomers comprise halogen, bromo, chloro, fluoro, alkyl, particularly $C_1$-$C_{10}$ alkyl, allyl, alkenyl, ether, alkyl ether, cyano and the like. Additional biphenol monomers may be either symmetrical or unsymmetrical. Thus in one embodiment, the present invention provides a polyethersulfone composition comprising structural units derived from 4,4'-biphenol and bisphenol A and at least one additional diphenolic monomer, said structural units derived from 4,4'-biphenol being present in an amount corresponding to greater than 65 mole percent based on the total moles of all diphenolic monomer derived structural units, said structural units derived from said additional diphenolic monomer being present in an amount corresponding to 5 mole % or less based on the total moles of all diphenolic monomer derived structural units.

A wide variety of structural units derived from such additional diphenolic monomers may be present in the polyethersulfone compositions of the present invention. For example, the polyethersulfone composition of the present invention may further comprise, in addition to the structural units derived from 4,4'-biphenol and bisphenol A diphenolic monomers represented by the formula (I):

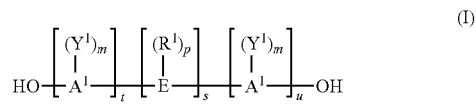

wherein $A^1$ represents an aromatic group including, but not limited to, phenylene, biphenylene, naphthylene, and the like. In some embodiments E may be an alkylene or alkylidene group including, but not limited to, methylene, ethylene, ethylidene, propylene, propylidene, isopropylidene, butylene, butylidene, isobutylidene, amylene, amylidene, isoamylidene, and the like. In other embodiments when E is an alkylene or alkylidene group, it may also consist of two or more alkylene or alkylidene groups connected by a moiety different from alkylene or alkylidene, including, but not limited to, an aromatic linkage; a tertiary nitrogen linkage; an ether linkage; a carbonyl linkage; a silicon-containing linkage, silane, siloxy; or a sulfur-containing linkage including, but not limited to, sulfide, sulfoxide, sulfone, and the like; or a phosphorus-containing linkage including, but not limited to, phosphinyl, phosphonyl, and the like. In other embodiments E may be a cycloaliphatic group including, but not limited to, cyclopentylidene, cyclohexylidene, 3,3,5-trimethylcyclohexylidene, methylcyclohexylidene, 2-(2.2.1)-bicycloheptylidene, neopentylidene, cyclopentadecylidene, cyclododecylidene, adamantylidene, and the like; a sulfur-containing linkage, including, but not limited to, sulfide, sulfoxide or sulfone; a phosphorus-containing linkage, including, but not limited to, phosphinyl or phosphonyl; an ether linkage; a carbonyl group; a tertiary nitrogen group; or a silicon-containing linkage including, but not limited to, silane or siloxy. $R^1$ independently at each occurrence comprises a monovalent hydrocarbon group including, but not limited to, alkenyl, allyl, alkyl, aryl, aralkyl, alkaryl, or cycloalkyl. In various embodiments a monovalent hydrocarbon group of $R^1$ may be halogen-substituted, particularly fluoro- or chloro-substituted, for example as in dichloroalkylidene, particularly gem-dichloroalkylidene. $Y^1$ independently at each occurrence may be an inorganic atom including, but not limited to, halogen (fluorine, bromine, chlorine, iodine); an inorganic group containing more than one inorganic atom including, but not limited to, nitro; an organic group including, but not limited to, a monovalent hydrocarbon group including, but not limited to, alkenyl, allyl, alkyl, aryl, aralkyl, alkaryl, or cycloalkyl, or an oxy group including, but not limited to, $OR^2$ wherein $R^2$ is a monovalent hydrocarbon group including, but not limited to, alkyl, aryl, aralkyl, alkaryl, or cycloalkyl; it being only necessary that $Y^1$ be inert to and unaffected by the reactants and reaction conditions used to prepare the polymer. In some particular embodiments $Y^1$ comprises a halo group or $C_1$-$C_6$ alkyl group. The letter "m" represents any integer from and including zero through the number of replaceable hydrogens on $A^1$ available for substitution; "p" represents an integer from and including zero through the number of replaceable hydrogens on E available for substitution; and the parameters "t", "s" and "u" each represent an integer equal to at least one.

In bisphenol monomers of formula (I) above, when more than one $Y^1$ substituent is present, they may be the same or different. The same holds true for the $R^1$ substituent. The positions of the hydroxyl groups and $Y^1$ on the aromatic nuclear residues $A^1$ can be varied in the ortho, meta, or para positions and the groupings can be in vicinal, asymmetrical or symmetrical relationship, where two or more ring carbon atoms of the aromatic residue are substituted with $Y^1$ and hydroxyl groups. In some particular embodiments the parameters "t", "s", and "u" each have the value of one; both $A^1$ radicals are unsubstituted phenylene radicals; and E is an alkylidene group such as isopropylidene. In some particular embodiments both $A^1$ radicals are p-phenylene, although both may be o- or m-phenylene or one o- or m-phenylene and the other p-phenylene.

In some embodiments of the present invention additional bisphenol monomers that may be used comprise those disclosed by name or formula (generic or specific) in U.S. Pat. Nos. 2,991,273, 2,999,835, 3,028,365, 3,148,172, 3,153,008, 3,271,367, 3,271,368, and 4,217,438. In other embodiments of the invention, additional bisphenol monomers comprise bis(4-hydroxyphenyl)sulfide, bis(4-hydroxyphenyl) ether, bis(4-hydroxyphenyl)sulfone, bis(4-hydroxyphenyl)sulfoxide, 4,4'-oxydiphenol, 2,2-bis(4-hydroxyphenyl)hexafluoropropane, 4,4'-(3,3,5-trimethylcyclohexylidene)diphenol; 1,1-bis(4-hydroxy-3-methylphenyl)cyclohexane; 4,4-bis(4-hydroxyphenyl)heptane; 2,4'-dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,2-bis(4-hydroxyphenyl)ethane; 1,1-bis(4-hydroxy-2-chlorophenyl)ethane; 2,2-bis(3-phenyl-4-hydroxyphenyl)propane; 2,2-bis(4-hydroxy-3-methylphenyl)propane; 2,2-bis(4-hydroxy-3-ethylphenyl)propane; 2,2-bis(4-hydroxy-3-isopropylphenyl)propane; 2,2-bis(4-hydroxy-3,5-dimethylphenyl)propane; 3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,4'-dihydroxyphenyl sulfone; 2,2-bis(4-hydroxyphenyl)butane; 2,2-bis(4-hydroxyphenyl)-2-methylbutane; 1,1-bis(4-hydroxyphenyl)cyclohexane; 2-(3-methyl-4-hydroxyphenyl-2-(4-hydroxyphenyl)propane; 2-(3,5-dimethyl-4-hydroxyphenyl)-2-(4-hydroxyphenyl) propane; 2-(3-methyl-4-hydroxyphenyl)-2-(3,5-dimethyl-4-hydroxyphenyl)propane; bis(3,5-dimethylphenyl-4-hydroxyphenyl)methane; 1,1-bis(3,5-dimethylphenyl-4-hydroxyphenyl)ethane; 2,2-bis(3,5-dimethylphenyl-4-hydroxyphenyl)propane; 2,4-bis(3,5-dimethylphenyl-4-hydroxyphenyl)-2-methylbutane; 3,3-bis(3,5-dimethylphenyl-4-hydroxyphenyl)pentane; 1,1-bis(3,5-dimethylphenyl-4-hydroxyphenyl)cyclopentane; 1,1-bis(3,5-dimethylphenyl-4-hydroxyphenyl)cyclohexane; bis(3,5-dimethyl-4-hydroxyphenyl) sulfoxide, bis(3,5-dimethyl-4-hydroxyphenyl) sulfone and bis(3,5-dimethylphenyl-4-hydroxyphenyl)sulfide.

In some embodiments of additional bisphenol monomers when E is an alkylene or alkylidene group, said group may be part of one or more fused rings attached to one or more aromatic groups bearing one hydroxy substituent. Suitable bisphenol monomers of this type include those containing indane structural units such as represented by the formula (II), which compound is 3-(4-hydroxyphenyl)-1,1,3-trimethylindan-5-ol, and by the formula (III), which compound is 1-(4-hydroxyphenyl)-1,3,3-trimethylindan-5-ol:

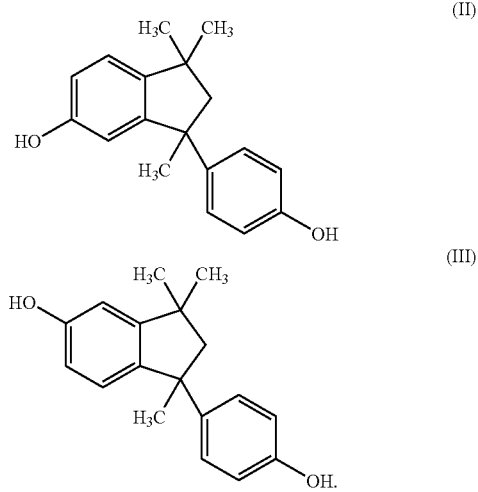

Also included among suitable additional bisphenol monomers of the type comprising one or more alkylene or alkylidene groups as part of fused rings are the 9,9-disubstituted fluorenes having formula (IV):

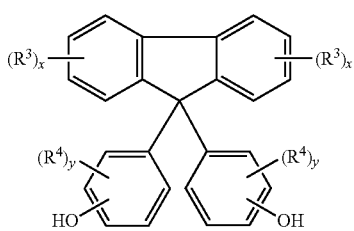

(IV)

wherein each $R^3$ and $R^4$ is independently selected from monovalent alkyl, aryl and halogen radicals; and the values for the parameters x and y are each independently selected from positive integers having a value of from 0 to 3 inclusive. In some embodiments the position of each hydroxy group is para to the fluorene ring linkage, although both may be ortho or meta or one ortho or meta and the other para. In a particular embodiment the 9,9-disubstituted fluorene is 9,9-bis(4-hydroxyphenyl) fluorene.

Also included among suitable additional bisphenol monomers of the type comprising one or more alkylene or alkylidene groups as part of fused rings are the 2,2,2',2'-tetrahydro-1,1'-spirobi(1H-indene)diols having formula (V):

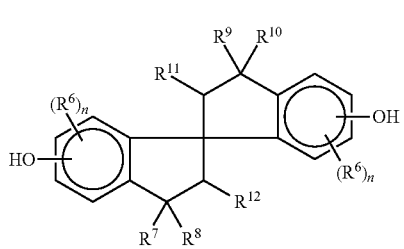

(V)

wherein each $R^6$ is independently selected from monovalent alkyl, aryl and halogen radicals; each $R^7$, $R^8$, $R^9$, and $R^{10}$ is independently $C_{1-6}$ alkyl; each $R^{11}$ and $R^{12}$ is independently H or $C_{1-6}$ alkyl; and each n is independently selected from positive integers having a value of from 0 to 3 inclusive. In a particular embodiment the 2,2,2',2'-tetrahydro-1,1'-spirobi(1H-indene)diol is 2,2,2',2'-tetrahydro-3,3,3',3'-tetramethyl-1,1'-spirobi(1H-indene)-6,6'-diol (sometimes known as "SBI"). Mixtures of any of the foregoing additional bisphenol monomers may also be employed.

In particular embodiments suitable additional bisphenol monomers include, but are not limited to, those of the formula (VI):

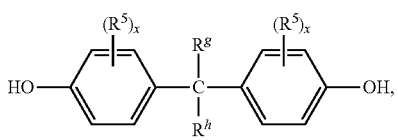

(VI)

wherein each $R^5$ is independently at each occurrence hydrogen, chlorine, bromine, alkyl or a $C_1$-$C_{30}$ monovalent hydrocarbon or hydrocarbonoxy group, and independently $R^g$ and $R^h$ are hydrogen, alkyl or a $C_1$-$C_{30}$ hydrocarbon group. The value for the parameter "x" is independently at each occurrence selected from positive integers having a value of from 0 to 3 inclusive.

In other particular embodiments suitable additional bisphenol monomers also include, but are not limited to, those of the formula (VII):

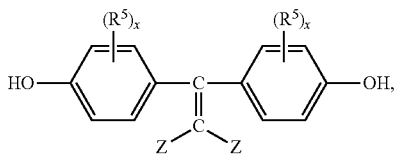

(VII)

wherein each $R^5$ is independently at each occurrence hydrogen, chlorine, bromine, alkyl or a $C_1$-$C_{30}$ monovalent hydrocarbon or hydrocarbonoxy group, and each Z is hydrogen, chlorine or bromine, subject to the provision that at least one Z is chlorine or bromine. The value for the parameter "x" is independently at each occurrence selected from positive integers having a value of from 0 to 3 inclusive. In a particular embodiment a suitable bisphenol monomer has the structure of formula (VII) wherein "x" is zero and Z is chlorine.

The term "alkyl" as used in the various embodiments of the present invention is intended to designate both linear alkyl, branched alkyl, aralkyl, cycloalkyl, bicycloalkyl, tricycloalkyl and polycycloalkyl radicals containing carbon and hydrogen atoms, and optionally containing atoms in addition to carbon and hydrogen, for example atoms selected from Groups 15, 16 and 17 of the Periodic Table. The term "alkyl" also encompasses that alkyl portion of alkoxide groups. In various embodiments normal and branched alkyl radicals are those containing from 1 to about 32 carbon atoms, and include as illustrative non-limiting examples $C_1$-$C_{32}$ alkyl optionally substituted with one or more groups selected from $C_1$-$C_{32}$ alkyl, $C_3$-$C_{15}$ cycloalkyl or aryl; and $C_3$-$C_{15}$ cycloalkyl optionally substituted with one or more groups selected from $C_1$-$C_{32}$ alkyl. Some particular illustrative examples comprise methyl, ethyl, n-propyl, isopropyl, n-butyl, sec-butyl, tertiary-butyl, pentyl, neopentyl, hexyl, heptyl, octyl, nonyl, decyl, undecyl and dodecyl. Some illustrative non-limiting examples of cycloalkyl and bicycloalkyl radicals include cyclobutyl, cyclopentyl, cyclohexyl, methylcyclohexyl, cycloheptyl, bicycloheptyl and adamantyl. In various embodiments aralkyl radicals are those containing from 7 to about 14 carbon atoms; these include, but are not limited to, benzyl, phenylbutyl, phenylpropyl, and phenylethyl. In various embodiments aryl radicals used in the various embodiments of the present invention are those substituted or unsubstituted aryl or heteroaryl radicals containing from 6 to 18 ring carbon atoms. Some illustrative non-limiting examples of these aryl radicals include $C_6$-$C_{15}$ aryl optionally substituted with one or more groups selected from $C_1$-$C_{32}$ alkyl, $C_3$-$C_{15}$ cycloalkyl or aryl. Some particular illustrative examples of aryl radicals comprise substituted or unsubstituted phenyl, biphenyl, toluyl and naphthyl. Heteroaryl groups comprise those containing from about 3 to about 10 ring carbon atoms, and include, but are not limited to, triazinyl, pyrinidinyl, pyridinyl, furanyl, thiazolinyl and quinolinyl.

As noted, the polyethersulfone compositions of the present invention have weight average molecular weights (Mw) as measured by gel permeation chromatography as described herein of at least 54,000 grams per mole and exhibit outstanding impact strength as measured by the Notched Izod impact strength test method ASTM D256.

In particular embodiments the polyethersulfones have weight average molecular weights in a range from 54,000 to about 66,000, or in a range from 54,000 to about 64,000, or in a range from 54,000 to about 60,000. In the context of the present invention, weight average molecular weights ($M_w$) are measured by gel permeation chromatography (GPC) versus polystyrene standards and are expressed in grams per mole.

In a particular embodiment of the invention the polyethersulfone composition comprises structural units derived from 4,4'-biphenol and bisphenol-A in a molar ratio of 70:30 and has a weight average molecular weight of at least about 55,000 grams per mole (as measured by gel permeation chromatography using polystyrene molecular weight standards) and a Notched Izod impact strength value of greater than 700 Joules per meter as measured by ASTM D256. In another embodiment, the polyethersulfone composition comprises structural units derived from 4,4'-biphenol and bisphenol-A in a molar ratio of about 70:30 and has a weight average molecular weight of at least about 60,000 grams per mole (as measured by gel permeation chromatography using polystyrene molecular weight standards) and a Notched Izod impact strength value of greater than 700 Joules per meter as measured by ASTM D256. In yet another embodiment, the polyethersulfone composition comprises structural units derived from 4,4'-biphenol and bisphenol-A in a molar ratio of about 80:20 and has a weight average molecular weight of at least about 57,000 grams per mole (as measured by gel permeation chromatography using polystyrene molecular weight standards) and a Notched Izod impact strength value of greater than 700 Joules per meter as measured by ASTM D256. In certain embodiments of the present invention the polyethersulfone composition has a melt viscosity of less than about 4,500 pascal seconds as measured at 340° C.

The polyethersulfones of the present invention may be made using known methods, for example, by the carbonate method or by the alkali metal hydroxide method. In a particular embodiment the polyethersulfones are made in a reaction mixture comprising alkali metal salts of a mixture of diphenolic monomers, at least one dihalodiarylsulfone monomer, at least one solvent and at least one phase transfer catalyst (hereinafter sometimes "PTC"). The alkali metal salts of the diphenolic monomer mixture are typically sodium or potassium salts. Sodium salts are often used in particular embodiments by reason of their availability and relatively low cost. In one embodiment, the salts are formed by contacting diphenolic monomers with an alkali metal carbonate. In another embodiment, the salts are formed by contacting diphenolic monomers with an alkali metal hydroxide.

A wide variety of dihalodiarylsulfone monomers may be used to prepare the polyethersulfone compositions of the present invention. Typically, sulfone-containing structural units are derived from a dihalodiarylsufone monomer which bears halogen substituents reactive towards displacement by phenoxide moieties (e.g. the phenoxide moieties present in the disodium salt of 4,4'-biphenol). In particular embodiments dihalodiarylsulfones comprise at least one of a dichloro- or a difluorodiaryl sulfone. In another particular embodiment the dihalodiarylsulfone comprises a dihalodiphenylsulfone. In still other particular embodiments the dihalodiarylsulfone comprises a 4,4'-dihalodiarylsulfone, Illustrative examples of 4,4'-dihalodiarylsulfones include 4,4'-dichlorodiphenylsulfone and 4,4'-difluorodiphenylsulfone.

In one embodiment the method of the invention employs at least one organic solvent of low polarity, usually a solvent of substantially lower polarity than that of typical dipolar aprotic solvents. In various embodiments the solvent has a boiling point above about 150° C. in order to facilitate the polymerization reaction which typically requires temperatures in a range of between about 125° C. and about 250° C. Suitable solvents of this type include, but are not limited to, ortho-dichlorobenzene, para-dichlorobenzene, dichlorotoluene, 1,2,4-trichlorobenzene, diphenyl sulfone, phenetole, anisole and veratrole, and mixtures thereof. In some embodiments the organic solvent forms an azeotrope with water. In another particular embodiment the organic solvent is ortho-dichlorobenzene.

In one embodiment, the polyethersulfone compositions of the present invention may be prepared by contacting a mixture comprising the dialkali metal salts of bisphenol-A and 4,4'-biphenol in a substantially dry solvent with at least one dihalodiarylsulfone in the presence of a phase transfer catalyst (PTC). In the various embodiments of the present invention suitable phase transfer catalysts are those that are substantially stable at temperatures required to effect reaction to make the polyethersulfones. Substantially stable in the present context means that the PTC is sufficiently stable at the temperatures needed to effect the desired polymerization reaction at a synthetically useful reaction rate. Different types of phase transfer catalysts may be employed. They include quaternary phosphonium salts of the type disclosed in U.S. Pat. No. 4,273,712; N-alkyl-4-dialkylaminopyridinium salts of the type disclosed in U.S. Pat. Nos. 4,460,778 and 4,595,760; and guanidinium salts of the type disclosed in U.S. Pat. Nos. 5,081,298, 5,116,975 and 5,132,423. In some particular embodiments suitable phase transfer catalysts, by reason of their exceptional stability at high temperatures and their effectiveness to produce high molecular weight aromatic polyether polymers in high yield, comprise alpha-omega-bis (pentaalkylguanidinium)alkane salts and hexaalkylguanidinium salts. Hexaalkylguanidinium salts include, but are not limited to, hexaalkylguanidinium halides and especially hexaalkylguanidinium chlorides. Methods for employing guanidinium salts as catalysts are disclosed, for example, in U.S. Pat. No. 5,229,482. In a particular embodiment a catalyst comprising hexaethylguanidinium chloride is employed.

In one embodiment of the present invention the catalyst is present in an amount corresponding to from about 0.5 mole percent to about 10 mole percent based on the total amount of alkali metal salt. The total amount of salt is defined herein as the total amount of the salts of the diphenolic monomers employed. In an alternate embodiment, the catalyst is present in an amount corresponding to from about 1 mole percent to about 4 mole percent based on the total amount of the salts of the diphenolic monomers employed. In another embodiment, the catalyst is present in an amount corresponding to from about 2 mole percent to about 4 mole percent based on the total amount of the salts of the diphenolic monomers employed.

In some embodiments, it is useful and convenient to employ a chain termination agent to limit the molecular weight of the product polyethersulfone. Thus, reaction mixtures used in the preparation of polyethersulfones of the invention may optionally comprise at least one chain termination agent. Suitable chain termination agents include, but are not limited to, all those comprising a single activated substituent capable of being displaced by a by a phenoxide moiety during the polymerization process thereby end-capping the polymer chain. In various embodiments suitable chain termination agents include, but are not limited to, alkyl halides such as alkyl chlorides, and aryl halides including, but not limited to, chlorides of formulas (VIII):

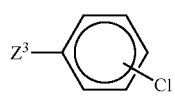
(VIII)

wherein the chlorine substituent is in the 3- or 4-position, and $Z^3$ is a substituted or unsubstituted alkyl or aryl group. Suitable chain termination agents encompassed by generic formula (VIII) include 2-chlorobenzophenone, 4-chlorobenzophenone, 2-chlorophenyl phenyl sulfone, 4-chlorophenyl phenyl sulfone (CAS Registry No. 80-00-2) and the like. Other suitable chain-termination agents comprise activated phthalimides, illustrative examples of which include, but are not limited to, chloro-N-arylphthalimides, chloro-N-alkylphthalimides, 3-chloro-N-phenylphthalimide, 4-chloro-N-phenylphthalimide, 3-chloro-N-methylphthalimide and 4-chloro-N-methylphthalimide. Mixtures comprising two or more chain termination agents can also be used.

A chain termination agent may optionally be added to the reaction mixture in any convenient manner. Typically, when the chain termination agent is employed to limit the molecular weight of the product polyethersulfone composition, all of the reactants, including the chain termination agent, are combined at the outset of the polymerization reaction. In particular embodiments at least one chain termination agent is added all at once or in portions at any time during the polymerization reaction. The chain termination agent may be added by itself or in admixture with one or more monomers.

The reaction temperature employed in the polymerization reaction is typically in a range of between about 125° C. and about 250° C. In one embodiment, the polymerization reaction is carried out at a temperature in a range of between about 180° C. and about 225° C. In an alternate embodiment the polymerization reaction is carried out at a temperature a range of between about 150° C. and about 180° C. In yet another embodiment, at least a portion of the polymerization reaction is carried out at a temperature of at least 150° C.

In one embodiment, the reagents employed; the phase transfer catalyst, the alkali metal salts of the diphenolic monomers, the dihalodiarylsulfone and the solvent, are substantially dry. In the present context substantially dry means that the reaction mixture comprising the said reactants contains at most about 100 ppm by weight of water. In some particular embodiments the amount of water in the reaction mixture is less than about 50 ppm, and in still other embodiments less than about 20 ppm. The proportion of water may be determined by any convenient means and is typically determined by Karl Fischer coulometric titration. In some embodiments the amount of water in the reaction mixture is determined indirectly by measuring water content of an over-head distillate or condensate. In the present invention dry catalyst is employed which means that in one embodiment the catalyst contains less than about 100 ppm water, in another embodiment less than about 50 ppm water, and in another embodiment less than about 30 ppm water.

Following the achievement of a desired molecular weight the polymerization reaction may be quenched by addition of a quenching agent. Suitable quenching agents typically comprise at least one acidic compound, said acidic compound being in solid, liquid, gaseous, or solution form. Suitable acids include organic acids, particularly carboxylic acids such as acetic acid, malic acid, oxalic acid, and the like. Suitable acids also include inorganic acids such as phosphorous acid, phosphoric acid, polyphosphoric acid, hypophosphorous acid, sulfuric acid, hydrochloric acid, anhydrous hydrochloric acid, and the like. A gaseous acid, such as anhydrous hydrochloric acid, can be bubbled into the mixture through a sparger or delivered as a solution in a convenient solvent such as the same organic solvent as used in polymerization reaction. Mixtures comprising at least two acids may also be employed.

The amount of quenching agent used is an amount sufficient to end the polymerization reaction. In particular embodiments the amount of acid quenching agent used is at least sufficient to react with the calculated amount of phenoxide end-groups that will be present for a given molecular weight of polyethersulfone product. Preferably the quantity of acid added is greater than the calculated amount and more preferably about twice the calculated amount of phenoxide end-groups that will be present for a given molecular weight of polyethersulfone product. The acid may be added using any convenient protocol. In some embodiments the amount of acid added is in a range of between about 0.02 to about 0.21 millimoles (mmol) acid per gram of polymer or between about 0.07 to about 0.21 mmol acid per gram of polymer.

The polyethersulfones may be isolated by conventional methods. These include, but are not limited to, one or more steps of salt agglomeration, filtration, washing with water, solvent removal, precipitation, drying and the like. In some embodiments a reaction mixture comprising polyethersulfone is combined with a non-solvent for the polyethersulfone to effect precipitation of the polymer. In another embodiment the polymer can be isolated by steps which comprise total devolatilization, for example in a devolatilizing extruder.

In one embodiment, the polyethersulfones of the invention are characterized by a glass transition temperature (Tg), greater than 210° C. In another embodiment, the polyethersulfones of the invention are characterized by a glass transition temperature greater than 212° C. In yet another embodiment, the polyethersulfones of the invention are characterized by a glass transition temperature greater than 215° C. In one embodiment, the polyethersulfones of the invention are further characterized by a glass transition temperature (Tg), in a range from 211° C. to about 225° C. Those skilled in the art will appreciate that the polyethersulfone compositions of the present invention may comprise structural units derived from one or more diphenolic monomers in addition to structural units derived from 4,4'-biphenol and structural units derived from bisphenol A, provided that greater than 65 mole percent of all structural units derived from a diphenolic compound are derived from 4,4'-biphenol. These "additional" structural units which may be present in the polyethersulfone composition may act to raise or lower the glass transition temperature of the polyethersulfone composition. For example, polyethersulfone compositions comprising structural units derived from 2-(3-hydroxyphenyl)-2-(4-hydroxyphenyl)propane (CAS No. 46765-25-7, also referred to herein as 3,4-bisphenol A) will tend to have lower glass transition temperatures compared to the corresponding polyethersulfone compositions wherein the structural units derived from 3,4-bisphenol A are replaced by structural units derived from bisphenol A. For example, a polyethersulfone composition comprising as the only "diphenolic" (i.e. derived from a diphenolic compound) structural units those derived from 4,4'-biphenol, bisphenol A, and 3,4-bisphenol A in a molar ratio of 75:05:20 will have a lower glass transition temperature than the corresponding polyethersulfone composition (of the same molecular weight) comprising structural units derived from 4,4'-biphenol and bisphenol A in a molar ratio of 75:25. Similarly, a polyethersulfone composition comprising as the only "diphenolic" (i.e. derived from a diphenolic compound) structural units those derived from 4,4'-biphenol, bisphenol A, and 2,2,2',2'-tetrahydro-3,3,3',3'-tetramethyl-1,1'-spirobi(1H-indene)-6,6'-diol (SBI) in a molar ratio of 75:15:10 will have a higher glass transition temperature than the corresponding polyethersulfone composition (of the same molecular weight) comprising structural units derived from 4,4'-biphenol and bisphenol A in a molar ratio of 75:25. As noted, in one embodiment, such "additional" structural units represent no more than 5 mole percent of all structural units derived from diphenolic monomers.

In one embodiment, the polyethersulfone compositions of the present invention have a Notched Izod impact strength value of greater than 700 Joules per meter ($Jm^{-1}$) as determined using ASTM D256. In one embodiment, the polyethersulfone compositions of the present invention have a Notched Izod impact strength value in a range of between about 700 $Jm^{-1}$ and about 825 $Jm^{-1}$.

Melt viscosities of polyethersulfones of the invention may be measured as zero shear melt viscosities at 340° C. In one embodiment the polyethersulfone compositions of the invention possess a melt viscosity of less than about 6,000 pascal·seconds (Pa·s). In another embodiment, the melt viscosity is less than about 5,500 Pa·s. In yet another embodiment, the melt viscosity is in a range between about 3,000 and about 4,000 Pa·s. In yet still another embodiment, the melt viscosity is in a range between about 3,500 and about 4,000 Pa·s.

EXAMPLES

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. While only certain features of the invention have been illustrated and described herein, many modifications and changes will occur to those skilled in the art. Accordingly, these examples are not intended to limit the invention, as defined in the appended claims, in any manner. In the following examples values for glass transition temperatures (Tg) were determined by differential scanning calorimetry (DSC) at a heating rate of 20° C. per minute. Weight average molecular weights ($M_w$) were measured by gel permeation chromatography (GPC) versus polystyrene standards using as solvent a mixture of chloroform and 3.5 vol. % isopropanol. The GPC column was a Mixed-C column with dimensions 300 millimeters (mm)×7.5 mm available from Polymer Laboratories.

POLYMERIZATION PROCEDURE: A slurry of the disodium salt of bisphenol-A (5.271 grams, 19.361 millimoles) and the disodium salt of biphenol 17.9172 grams, 77.842 millimoles) having a water content of less than about 20 parts per million (ppm) water was prepared in dry o-dichlorobenzene (131 grams) in a 250 milliliter three-neck round-bottom flask equipped with short-path distillation head, mechanical stirrer and gas inlet under an inert atmosphere. A portion of o-dichlorobenzene (about 45 grams) was then distilled off at a temperature of about 200-220° C. The distillation was carried out until the water concentration of the distillate was below about 15 ppm. Dichlorodiphenylsulfone (27.9137 grams, 97.204 millimoles) and o-dichlorobenzene (52.7 grams) were then added to the reaction mixture. A portion of o-dichlorobenzene (about 45 grams) was distilled out until the water concentration of the distillate was below about 15 ppm. A solution of hexaethylguanidinium chloride (0.79 molar) phase transfer catalyst in dry o-dichlorobenzene (5.0 milliliters, 3.95 millimoles) was added to the reaction mixture over a time period of about two minutes. Polymerization occurred as a slightly exothermic reaction. Periodically, samples were taken to monitor molecular weight of the growing polymer product. When the target molecular weight was reached, the reaction was quenched with 85% phosphoric acid (80 to 150 milligrams) at 180° C. with stirring and then the mixture was diluted with o-dichlorobenzene (265 milliliter; 346 grams) to about 10% solids.

The polymer obtained by the above process was then purified and isolated. Sodium chloride formed as a by-product was removed by agglomeration and filtration. Agglomeration of the NaCl was achieved at 90° C. by addition of 0.3 weight % water (based on wt. o-dichlorobenzene+wt. polymer) with vigorous stirring, and the residual water was boiled off at 150° C. The mixture was cooled to 90° C. followed by filtration using a filter having a pore size of from 2-10 microns under a pressure of about 0.138 megapascals. The filtration was performed as many times as necessary to reduce the sodium chloride to a level of less than about 5 ppm as measured by sodium ion specific probe (typically one filtration was enough). The catalyst was removed by a water wash (1:2 weight ratio of water to organic phase) at 90° C. under stirring for a time sufficient to ensure good interaction of the water with the organic layer. Stirring was discontinued and the organic phase was separated from the aqueous phase and the process was repeated as necessary until the amount of the catalyst was less than about 250 ppm with respect to the polymer as measured ion chromatography.

In an alternative procedure catalyst may be removed by anti-solvent precipitation into methanol. Again, the process may be repeated as necessary until the amount of the catalyst is less than about 250 ppm with respect to the polymer as measured by ion chromatography. In another alternative procedure, the catalyst may be removed by adsorption using silica gel.

Isolation of the polymer itself was carried out by anti-solvent precipitation into methanol using a ratio of 1:4 organic solution:methanol by volume. The polymer was isolated, for example, by filtration and then redissolved in chloroform at a concentration of about 10% solids followed by a second anti-solvent precipitation into methanol (1:4 organic solution:methanol by volume), filtration and drying at elevated temperature under vacuum. Alternatively, the polymer may be isolated by devolatilization of solvent using a vacuum-vented extruder.

Characterization data for polyethersulfones which are Examples of the invention or which are Comparative Examples are shown in Table 1. In Table 1 the abbreviations are defined as follows: CEx.=Comparative Example (i.e. a composition which falls outside the scope of the invention; A=bisphenol-A; B=4,4'-biphenol; US=unstabilized composition; S=composition stabilized by addition of 1300 ppm IRGANOX 1010 and 2600 ppm IRGAFOS 168 commercial stabilizers. Comparative Example 1 was a commercial polyethersulfone available from Solvay Advanced Polymers under the tradename UDEL. Comparative Example 2 was a commercial polyethersulfone available from Solvay Advanced Polymers under the tradename RADEL R. The data in Table 1 show that the polyethersulfones of the present invention possess surprisingly better properties than the commercial polyethersulfones of Comparative Examples-1 and -2, and possess as well surprisingly superior properties relative to closely related compositions falling outside the scope of the invention.

TABLE 1

|  | Ex. 1 | Ex. 2 | Ex. 3 | CEx. 1 | CEx. 2 | CEx. 3 | CEx. 4 | CEx. 5 | CEx. 6 | CEx. 7 |
|---|---|---|---|---|---|---|---|---|---|---|
| Formulation (mole %) | 30% A + 70% B | 30% A + 70% B (S) | 20% A + 80% B | 100% A | 100% B | 30% A + 70% B | 40% A + 60% B (US) | 40% A + 60% B (S) | 35% A + 65% B (S) | 40% A + 60% B |
| Molecular weight ($M_w$) | 55200 | 60000 | 57700 | 62000 | 45000 | 52500 | 55000 | 55400 | 59800 | 54000 |
| $T_g$ (° C.) | 212 | 213 | 216 | 190 | 224 | 208 | 209 | 209 | 211 | 209 |
| Zero Shear Viscosity at 340° C. (Pa · sec) | 3520 | 5700 | 5100 | 1770 | 4480 | 3480 | 3150 | 3600 | 5000 | 3350 |
| Notched Izod ($Jm^{-1}$) | 803 | 823 | 803 | 35 | 700 | 165 | 112 | 106 | 176 and 800* | 130 |

The data in Table 1 clearly illustrate the invention. Thus, Examples 1-3 (Ex. 1 to Ex. 3) illustrate embodiments of the present invention wherein the polyethersulfone composition comprises structural units derived from bisphenol-A and greater than 65 mole percent of 4,4'-biphenol based on total moles of diphenolic monomers, wherein the polyethersulfone has a minimum weight average molecular weight ($M_w$) of 54,000 grams per mole as measured by gel permeation chromatography. Each of the compositions of Examples 1-3 exhibits a Notched Izod impact strength value of greater than 700 Joules per meter as measured by ASTM D256. It should be noted that for polyethersulfone compositions of the claimed invention, the experimental data of Table 1 reveal that when the weight average molecular weight ($M_w$) of a polyethersulfone composition is 54,000 grams per mole or higher as determined by gel permeation chromatography, the Notched Izod impact strength is greater than 700 Joules per meter. The Applicants' data reveal the surprising combined effect of molecular weight and composition (e.g. the relative amounts of structural units derived from 4,4'-biphenol and structural units derived from bisphenol A) on the properties of the product polyethersulfone. Each of the polyethersulfones of Examples 1-3 shows outstanding performance in the Notched Izod test, each of Examples 1-3 outperforming the polyethersulfone composition of Comparative Example-2, a commercially available polyethersulfone composition exhibiting high impact strength as measured by ASTM D256.

The polyethersulfone composition of Comparative Example-2 consists essentially of (ignoring endgroups) structural units derived from 4,4'-biphenol and bis(4-halophenyl)sulfone. It should be noted that it is unexpected that each of the compositions of Examples 1-3 should outperform the composition of Comparative Example-2 in light of the performance of the polyethersulfone composition of Comparative Example-1 which (ignoring endgroups) consists essentially of structural units derived from bisphenol A and bis(4-halophenyl)sulfone. It would be expected that the polyethersulfone compositions of Examples 1-3 would exhibit worse, rather than improved performance in the Notched Izod test if the superior Notched Izod performance of Comparative Example-2 is to be attributed to the presence of structural units derived from 4,4'-biphenol and the poor Notched Izod performance of Comparative Example-1 is to be attributed to the presence of structural units derived from bisphenol A. In transitioning from the composition of Comparative Example-2 to the composition of Comparative Example-1, it would be expected that replacement of structural units derived from 4,4'-biphenol in Comparative Example-2 with structural units derived from bisphenol A would degrade rather than improve Notched Izod performance of the resulting composition. The data presented for Examples 1-3 reveal exactly (and unexpectedly) the opposite result, namely an improvement in Notched Izod performance as structural units derived from 4,4'-biphenol are replaced with structural units derived from bisphenol A, provided that structural units derived from 4,4'-biphenol are present in an amount greater than 65 mole percent based on all structural units derived from diphenolic monomers.

The data provided by Comparative Examples 3-7 confirms the unexpected results obtained for the compositions of Examples 1-3. Comparative Example-3 falls within the required compositional space (i.e. Comparative Example-3 comprises structural units derived from bisphenol-A and greater than 65 mole percent of 4,4'-biphenol based on total moles of diphenolic monomers), but falls outside of the required molecular weight range and hence fails to exhibit a high Notched Izod impact strength value characteristic of the compositions of the present invention, the composition of Comparative Example-3 having a weight average molecular weight of less than 54,000 grams per mole. Here again, the result is both surprising and unexpected, the difference in molecular weight between the composition of Example 1 and that of Comparative Example-3 is slight, and yet the effect on Notched Izod performance is marked. Comparative Examples 4, 5, 6 and 7 further illustrate the requirement that the polyethersulfone composition of the present invention comprise greater than 65 mole percent of 4,4'-biphenol-derived structural units, and have a weight average molecular weight ($M_w$) of at least 54,000 grams per mole. The compositions of Comparative Examples 4, 5, 6 and 7 have weight average molecular weights ($M_w$) of 54,000 grams per mole or higher and yet the Notched Izod performance of these compositions is poor relative to the compositions of Examples 1-3. Again, the difference between the 4,4'-biphenol content of Examples 1-3 and Comparative Examples 4-7 is slight (5-10 mole percent) and yet the effect is pronounced. Comparative Example-6 comprising 65 mole percent structural units derived from 4,4'-biphenol falls just outside of the compositional space of the invention and illustrates the need for greater than 65 mole percent 4,4'-biphenol derived structural units. The composition of Comparative Example-6 exhibited two ranges of impact strength values indicating that the test specimens were at the ductile-brittle transition point for this particular composition.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All Patents and published articles cited herein are incorporated herein by reference.

The invention claimed is:

1. A polyethersulfone composition comprising structural units derived from bisphenol-A and 4,4'-biphenol, said structural units derived from 4,4'-biphenol being present in an amount corresponding to greater than 65 mole percent based on total moles of structural units derived from diphenolic monomers, wherein the polyethersulfone has a weight average molecular weight ($M_w$) of at least 54,000 grams per mole as measured by gel permeation chromatography.

2. The composition according to claim 1, wherein the structural units derived from 4,4'-biphenol are present in an amount corresponding to from about 70 to about 98 mole percent based on total moles of diphenolic monomers.

3. The composition according to claim 1, wherein the structural units derived from 4,4'-biphenol are present in an amount corresponding to from about 70 to about 85 mole percent based on total moles of diphenolic monomers.

4. The composition according to claim 1, wherein the polyethersulfone further comprises structural units derived from at least one additional diphenolic monomer, said structural units derived from said additional diphenolic monomer being present in an amount corresponding to 5 mole % or less based on total moles of all diphenolic monomer derived structural units.

5. The composition according to claim 4, wherein the additional diphenolic monomer is at least one member selected from the group consisting of a substituted derivative of 4,4'-biphenol and those monomers of the formula

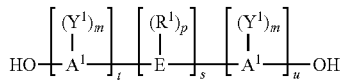

wherein $A^1$ represents an aromatic group; E comprises a sulfur-containing linkage, sulfide, sulfoxide, sulfone; a phosphorus-containing linkage, phosphinyl, phosphonyl; an ether linkage; a carbonyl group; a tertiary nitrogen group; a silicon-containing linkage; silane; siloxy; a cycloaliphatic group; cyclopentylidene, cyclohexylidene, 3,3,5-trimethylcyclohexylidene, methylcyclohexylidene, 2-(2.2.1)-bicycloheptylidene, neopentylidene, cyclopentadecylidene, cyclododecylidene, adamantylidene; an alkylene or alkylidene group, which group may optionally be part of one or more fused rings attached to one or more aromatic groups bearing one hydroxy substituent; an unsaturated alkylidene group; or two or more alkylene or alkylidene groups connected by a moiety different from alkylene or alkylidene and selected from the group consisting of an aromatic linkage, a tertiary nitrogen linkage; an ether linkage; a carbonyl linkage; a silicon-containing linkage, silane, siloxy; a sulfur-containing linkage, sulfide, sulfoxide, sulfone; a phosphorus-containing linkage, phosphinyl, and phosphonyl;

$R^1$ independently at each occurrence comprises a monovalent hydrocarbon group, alkenyl, allyl, alkyl, aryl, aralkyl, alkaryl, or cycloalkyl;

$Y^1$ independently at each occurrence is selected from the group consisting of an inorganic atom, a halogen; an inorganic group, a nitro group; an organic group, a monovalent hydrocarbon group, alkenyl, allyl, alkyl, aryl, aralkyl, alkaryl, cycloalkyl, and an alkoxy group;

the letter "m" represents any integer from and including zero through the number of replaceable hydrogens on $A^1$ available for substitution;

the letter "p" represents an integer from and including zero through the number of replaceable hydrogens on E available for substitution; and "t", "s" and "u" each represent an integer equal to at least one.

6. The composition according to claim 4, wherein the additional diphenolic monomer is at least one member selected from the group consisting of those monomers of the formulas

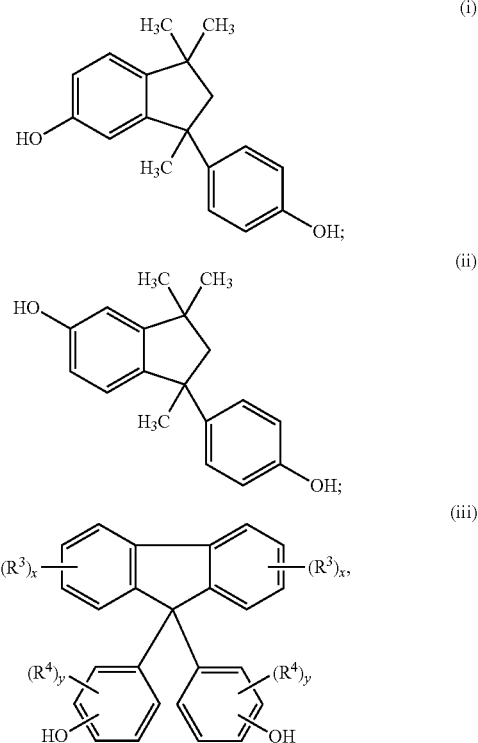

wherein each $R^3$ and $R^4$ is independently selected from monovalent alkyl, aryl and halogen radicals; and the values for the parameters "x" and "y" are each independently selected from positive integers having a value of from 0 to 3 inclusive;

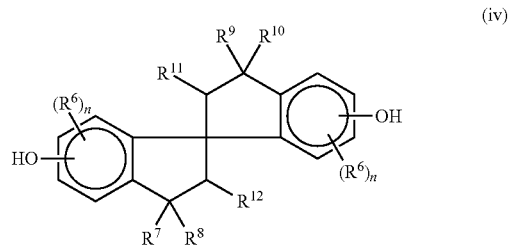

wherein each $R^6$ is independently selected from monovalent alkyl, aryl and halogen radicals; each $R^7$, $R^8$, $R^9$, and $R^{10}$ is independently $C_{1-6}$ alkyl; each $R^{11}$ and $R^{12}$ is independently H or $C_{1-6}$ alkyl; and each "n" is independently selected from positive integers having a value of from 0 to 3 inclusive; and

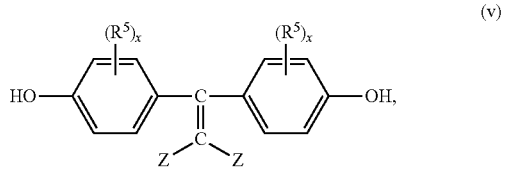

(v)

wherein each $R^5$ is independently at each occurrence hydrogen, chlorine, bromine, alkyl or a $C_1$-$C_{30}$ monovalent hydrocarbon or hydrocarbonoxy group, and each Z is hydrogen, chlorine or bromine, subject to the provision that at least one Z is chlorine or bromine, and the value for the parameter "x" is independently at each occurrence selected from positive integers having a value of from 0 to 3 inclusive.

7. The composition according to claim 6, wherein the additional diphenolic monomer is at least one member selected from the group consisting of 9,9-bis(4-hydroxyphenyl) fluorene and 2,2,2',2'-tetrahydro-3,3,3',3'-tetramethyl-1,1'-spirobi(1H-indene)-6,6'-diol.

8. The composition according to claim 1, wherein the polyethersulfone has a weight average molecular weight in a range from 54,000 to about 66,000.

9. The composition according to claim 1, wherein the polyethersulfone has a weight average molecular weight in a range from 54,000 to about 64,000.

10. The composition according to claim 1, wherein the polyethersulfone has a weight average molecular weight in a range from 54,000 to about 60,000.

11. The composition according to claim 1 having a glass transition temperature in a range from 211° C. and to about 225° C.

12. The composition according to claim 1 having a glass transition temperature greater than about 211° C.

13. The composition according to claim 1, wherein the polyethersulfone has a melt viscosity of less than about 4,500 pascal·seconds as measured at 340° C.

14. The composition according to claim 1, wherein the polyethersulfone further comprises structural units derived from at least one chain termination agent.

15. The composition according to claim 14, wherein the chain termination agent is at least one member selected from the group consisting of chloro-N-arylphthalimides, chloro-N-alkylphthalimides, alkyl halides, alkyl chlorides, aryl halides and aryl chlorides of formula:

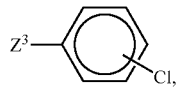

wherein the chlorine substituent is in the 3- or 4-position, and $Z^3$ comprises a substituted or unsubstituted alkyl or aryl group.

16. The composition according to claim 14, wherein the chain termination agent is at least one member selected from the group consisting of 4-chlorodiphenylsulfone, 3-chloro-N-phenylphthalimide, 3-chloro-N-methylphthalimide, 4-chloro-N-phenylphthalimide and 4-chloro-N-methylphthalimide.

17. A polyethersulfone composition comprising structural units derived from 4,4'-biphenol and bisphenol-A in a molar ratio range from 70:30 to 80:20 and having a weight average molecular weight ($M_w$) in a range from 54,000 grams per mole to about 60,000 grams per mole, said weight average molecular weights being determined by gel permeation chromatography, and wherein said structural units derived from 4,4'-biphenol are present in an amount corresponding greater than 65 mole percent based on total moles of structural units derived from diphenolic monomers.

18. An article comprising the composition of claim 1.

19. An article comprising the composition of claim 17.

20. A method for the synthesis of a polyethersulfone comprising structural units derived from bisphenol-A and 4,4'-biphenol, said structural units derived from 4,4'-biphenol being present in an amount corresponding to greater than 65 mole percent based on total moles of structural units derived from diphenolic monomers, wherein the said polyethersulfone has a weight average molecular weight ($M_w$) of at least 54,000 grams per mole as measured by gel permeation chromatography;
    wherein said method comprises the steps of:
        (a) contacting dialkali metal salts of said bisphenol-A and 4,4'-biphenol in a substantially dry solvent with at least one dihalodiarylsulfone in the presence of a phase transfer catalyst; and
        (b) quenching the reaction with an acidic quencher.

21. The method according to claim 20 wherein the solvent is at least one member selected from the group consisting of ortho-dichlorobenzene, dichlorotoluene, 1,2,4-trichlorobenzene, diphenyl sulfone, phenetole, anisole and veratrole.

22. The method according to claim 20 wherein the solvent is ortho-dichlorobenzene.

23. The method according to claim 20 wherein the salts are disodium salts.

24. The method according to claim 20 wherein the phase transfer catalyst is hexaethylguanidinium chloride.

25. The method according to claim 20 wherein the dihalodiarylsulfone is 4,4'-dichlorodiphenylsulfone.

26. The method according to claim 20 further comprising the step of isolating said polyethersulfone.

27. The method according to claim 20, wherein the polyethersulfone has a melt viscosity of less than about 4,500 pascal·seconds as measured at 340° C.

28. A polyethersulfone composition consisting essentially of structural units derived from a bis(4-halophenyl)sulfone, bisphenol-A, and 4,4'-biphenol, said structural units derived from 4,4'-biphenol being present in an amount corresponding to greater than 65 mole percent based on total moles of structural units derived from diphenolic monomers, wherein the polyethersulfone has a weight average molecular weight ($M_w$) of at least 54,000 grams per mole as measured by gel permeation chromatography.

* * * * *